United States Patent [19]

O'Connor

[11] Patent Number: 5,067,738
[45] Date of Patent: Nov. 26, 1991

[54] CHILD POWERED BICYCLE TRAILER

[76] Inventor: Richard J. O'Connor, 2035 Woodglen Crescent, Gloucester, Ontario, Canada, K15666

[21] Appl. No.: 600,730

[22] Filed: Oct. 22, 1990

[30] Foreign Application Priority Data

Jun. 21, 1990 [CA] Canada .................................. 2019471

[51] Int. Cl.$^5$ ............................................. B62K 27/00
[52] U.S. Cl. .................................... 280/204; 280/231; 280/239
[58] Field of Search ............... 280/204, 231, 292, 239, 280/304.1

[56] References Cited

U.S. PATENT DOCUMENTS

| | | | |
|---|---|---|---|
| 3,934,666 | 1/1976 | Ellington | 280/204 |
| 4,283,070 | 8/1981 | Forrestall et al. | 280/288.1 |
| 4,768,798 | 9/1988 | Reed et al. | 280/281.1 |
| 4,915,404 | 4/1990 | Chonan | 280/281.1 |

FOREIGN PATENT DOCUMENTS

| | | | |
|---|---|---|---|
| 811077 | 6/1951 | Fed. Rep. of Germany | 280/204 |
| 968629 | 12/1950 | France | 280/204 |
| 185820 | 11/1936 | Switzerland | 280/204 |

*Primary Examiner*—Kenneth R. Rice

[57] ABSTRACT

A single wheeled trailer for carrying an occupant is provided. The frame of the trailer is comprised of tow bar members of rectangular cross section and two non-symmetrical rear fork members which retain the single wheel. A hitch connected to a driving bicycle tows the trailer. A pedal assembly coupled to the frame enables the occupant to power the trailer wheel. The occupant of the trailer is forward facing and may help power the bicycle or be towed by the prime mover. The frame design allows ease of mounting and dismounting of the child.

14 Claims, 3 Drawing Sheets

CHILD POWERED BICYCLE TRAILER

FIELD OF THE INVENTION

The invention relates generally to a bicycle trailer and more specifically to a bicycle trailer capable of being powered by an occupant.

BACKGROUND OF THE INVENTION

Trends towards improved fitness through exercise have led to a resurgence in bicycle sales. Known systems show placement of a child either behind a principle rider on a seat located above a rear wheel or on a seat fitted in between a principle rider and a front set of handlebars. However, these designs have been known to cause the overall center of gravity to be higher than that of the principle rider and the bicycle and can contribute to an upset.

Commercially available bicycle trailers which are well known, allow a rider to tow one or two children, and offer the advantage of a lower center of gravity, as well as independent rolling elements for the trailer. It has been found however, that some children prefer to participate in cycling rather than be passively towed by a lead bicycle.

It is an object of the invention to provide a trailer which may be powered by its occupant while under tow of a bicycle.

SUMMARY OF THE INVENTION

In accordance with the invention there is provided a trailer for attachment to a bicycle comprising a support member having a first and other end; detachable attachment means for pivotally attaching the first end of the support member to a portion of the bicycle; driving means attached to the support member between the first and other end; driveable ground engaging wheel rotatably mounted to the other end; and seat means attached to the support member for supporting the rider. The support member may conveniently include a general framework member. The detachable attachment means comprises a detachable hitch for attaching the support member to the bicycle. The hitch detachably attaches to a seat post on the bicycle and permits pivotable movement of the support member about the longitudinal axis of the seat post. The hitch also permits the support member to pivot in a plane defined by the ground engaging wheel.

In accordance with the invention there is further provided a trailer for attachment to a bicycle comprising: a support member having a first and other end; hitch means for detachable attachment to the bicycle, the hitch means permitting pivotable movement of the support member about a longitudinal axis of the seat post, and permitting pivotable movement of the support member in a plane defined by the driveable ground engaging wheel when attached to the bicycle; driving means attached to the support member intermediate the first and other end, the driving means including a crank assembly; geared driveable ground engaging wheel rotatably mounted to the other end; seat means attached to the support member for supporting the rider; a chain for coupling the crank assembly with the geared driveable ground engaging wheel; a bottom bracket support for coupling the driving means to the support member; handlebar means to provide support for a rider; a handlebar retaining block for securing the handlebar means to the support member; a seat for supporting the rider; and a seat post coupling the seat to the support member.

DESCRIPTION OF THE DRAWINGS

An embodiment of the invention will be described with references made to the accompanying drawings in which.

DETAILED DESCRIPTION

Figure 1:
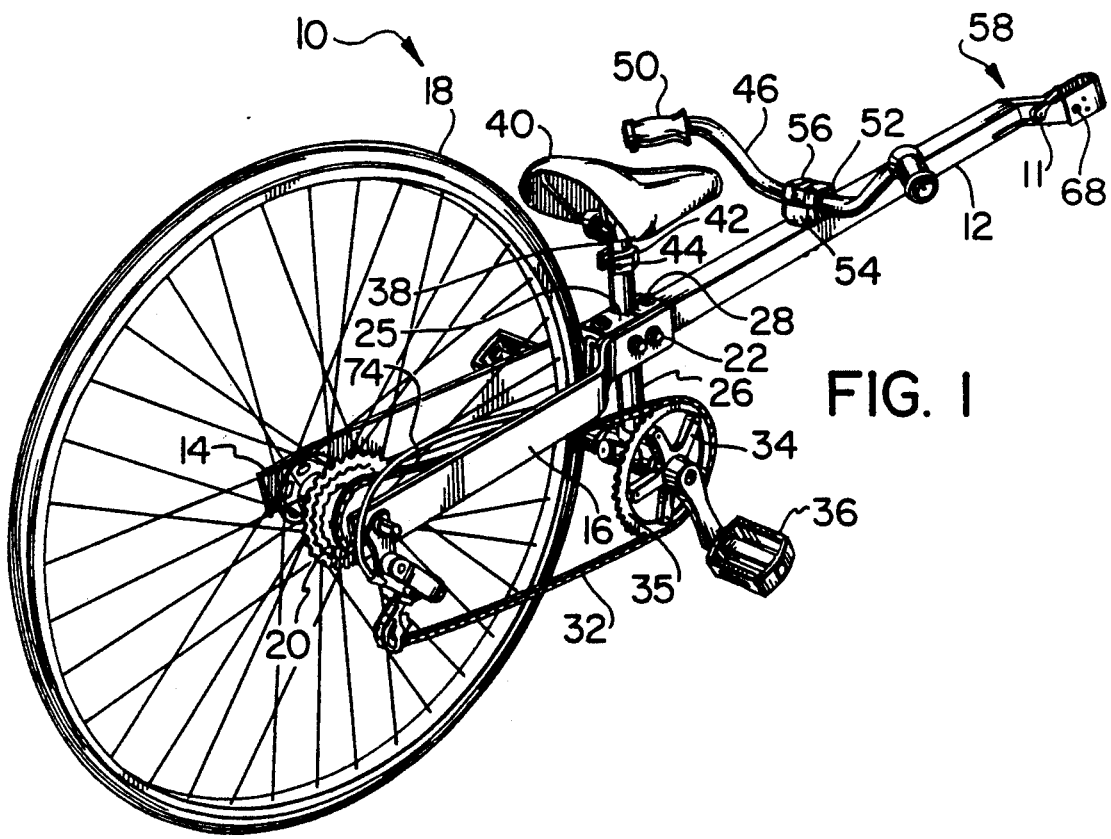
FIG. 1 is a pictorial view taken from a point above and slightly behind the trailer.

Referring to FIGS. 1 to 7, the general construction of the trailer consists of a general framework which is designated by the reference numeral 10 formed of a rigid lightweight extruded member of rectangular cross section. The general framework 10 comprises a segment 11 and a frame 12. Fitted to the frame 12 are two non-symmetrical rear forks designated in this description as an opposite driven side fork 14 and a driven side fork 16. A seat post holder 24 is bolted to the top of the frame 12 and houses a conventional seat post 38 and a seat 40. Affixed to an underside of the frame 12 is a bottom bracket support 26. An upper bolt block 52 and a lower bolt block 54 secure a set of handlebars 46. A conventional multi-speed driveable rear wheel 18 is located between the fork 14 and the fork 16. Driving means in the form of a chain 32 and a crank 34 is provided for driving a set of freewheel cogs of a freewheel 20. A pair of pedals 36 are fitted to the crank 34. A derailleur 30 is used for shifting the chain 32 onto the cogs as in conventional derailleur equipped bicycles. A derailleur cable 76 links the derailleur 30 with a shift lever 72. A hitch assembly 58 provides the connection between the trailer and a driving bicycle 78. A "U" shaped hitch plate 62 mates with the segment 11 connected to the frame 12 behind the driving bicycle seat post. A main hitch bolt 68 retains the segment 11 to the "U" shaped hitch plate 62.

More particularly in FIG. 1., the segment 11 is joined to the frame 12. The addition of this segment provides adequate clearance between the frame 12 and the bicycle rear wheel by offsetting the bicycle trailer rearward with respect to the bicycle 78. It is evident that the frame 12 could be fabricated out of circular tubing with appropriate end modifications. The material is required to be lightweight and rigid with aluminum being an ideal candidate. However recent advances in plastics and composite bicycle frames would lend themselves well to this application. Suitability of the cross section and the type of tubing used would be apparent to those skilled in the art.

Figure 3:
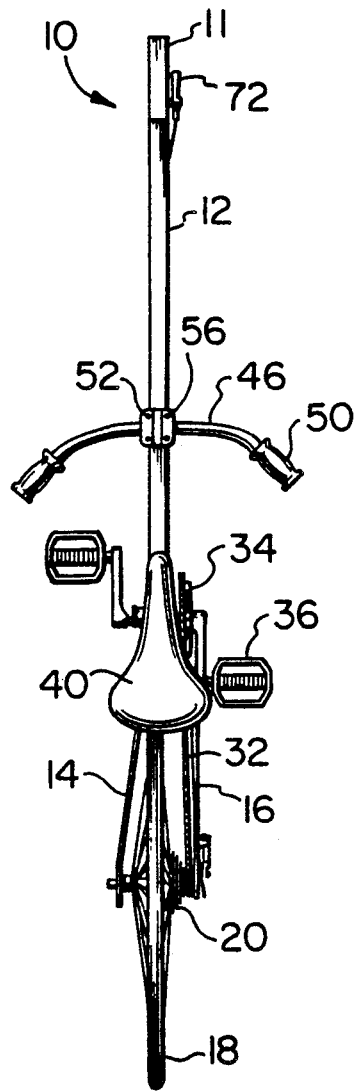
FIG. 3 is generally a top view taken about an axis perpendicular to the trailer frame.
Figure 4:
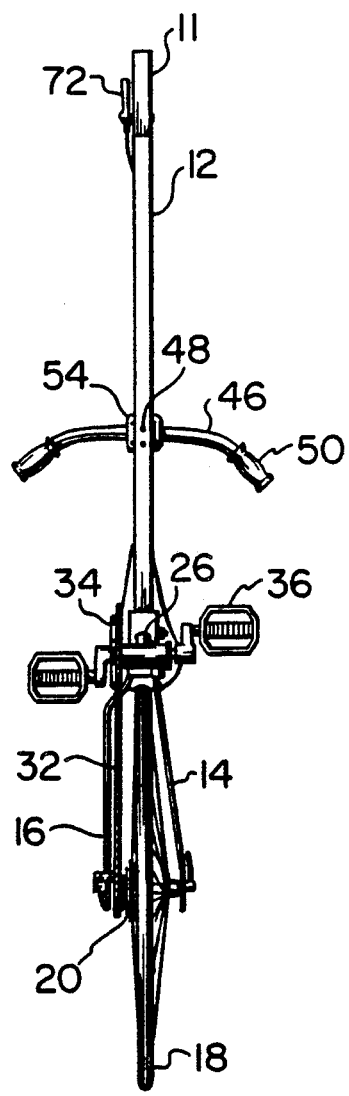
FIG. 4 is generally a bottom view taken about an axis perpendicular to the trailer frame.

It is apparent from FIG. 3 and FIG. 4 that the rearmost vertical flat sides of the frame 12 provide two parallel surfaces onto which the two non-symmetrical rear forks are attached. The offset of both the rear forks 14 and 16 to the frame center are equal allowing the rear wheel to track centrally with the frame. The shape of each fork differs due to the presence of the chain and freewheel assembly. The radius and length between bends on the driven side fork 16 are determined by the clearance between the chain and the fork throughout the available gears. Two bolts 22 locate the forks 14 and 16. Two slots are offered which allow the rear wheel to be quickly installed or removed for transit.

As illustrated in the drawings, the seat post holder 24 is comprised of a seat post tube having an inner diameter slightly greater than the seat post 38 and is joined to an upper base plate 25. The seat post holder 24 is mounted on the generally top side of the frame 12 at the rearmost location on the rectangular member. The rear top portion of the seat post tube has a slot which allows a seat post clamp 42 to grip the seat post 38 by tightening a seat post bolt 44. Two bolts 28 secure the seat post holder 24 to the frame 12. The seat and seat post are of conventional design. The lower face of the frame 12 provides the location for the bottom bracket support 26 which is joined to a lower base plate 27. The two bolts 28 also secure the bottom bracket support to the frame 12. It is also apparent that since the seat post holder 24 and the bottom bracket support 26 are detachable, proper sizing to the child can be obtained by offering these components in various overall lengths. Commonly available crank axle, bearings, pedals and crank arms are shown in FIGS. 1 to 4. The incorporation of existing bicycle components reduces the cost of the trailer and provides ease of servicing.

Figure 2:
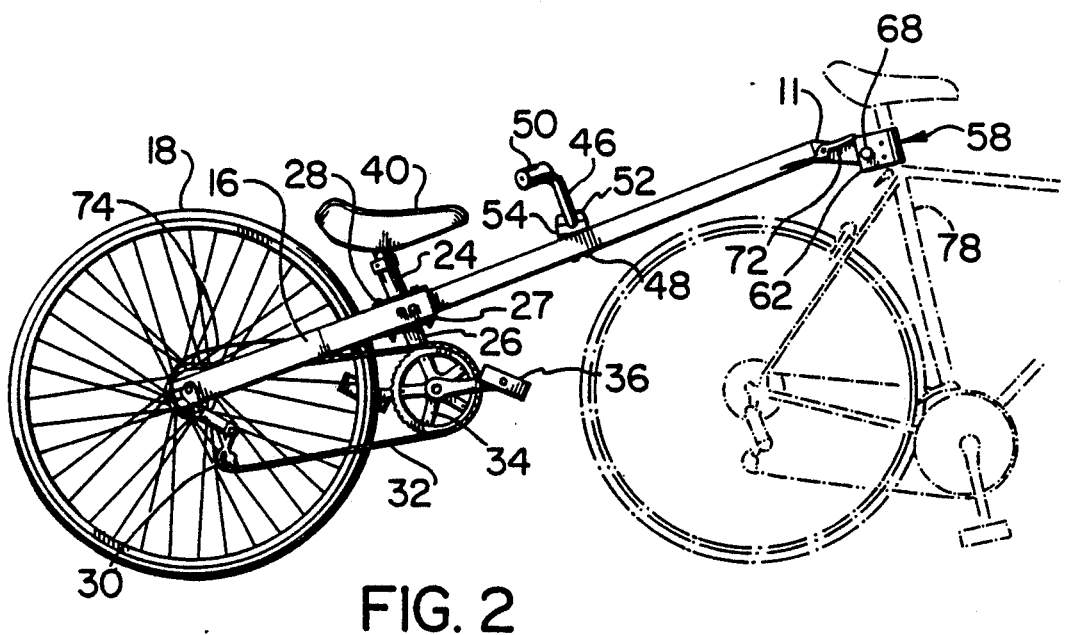
FIG. 2 is a side elevational view showing the trailer attached to a bicycle.

The chain 32 which is driven by a front sprocket 35 and is routed through the derailleur jockey wheels to a selected rear cog on the freewheel 20 allows a torque to be applied to the rear wheel 18 when the pedals are rotated clockwise with respect to the view in FIG. 2. Rotating the pedals counter-clockwise results in freewheel rotation only. The derailleur cable 76 which actuates the derailleur 30 along with a cable housing 74 is routed through the frame 12 at its most rearward point and leaves through a hole drilled in the frame side wall near the hitch assembly 58. The shift lever 72 fitted to the frame 12 is rotated by the bicycle rider about its pivoting axis to enable shifting of the derailleur on the trailer.

It can be seen in FIG. 3 that handlebars 46 are secured to the frame 12. The handlebars 46 are retained by the upper bolt block 52, and the lower bolt block 54. Four bolts 56 locate the handlebars 46 in position and at the desired angle. The upper bolt block 52 has four through holes which align with four tapped holes in the lower bolt block 54. As seen in FIG. 2 two bolts 48 mate the lower bolt block 54 to the frame 12. A series of holes in the frame 12 could allow for adjustment for the reach of the child as the lower bolt block 54 can be secured at more than one location along the generally upper surface of the frame 12. The handlebars 46 are intended simply to be a locating item for the hands of the child. Handlebar grips 50 are fitted to the bar ends.

Figure 5:
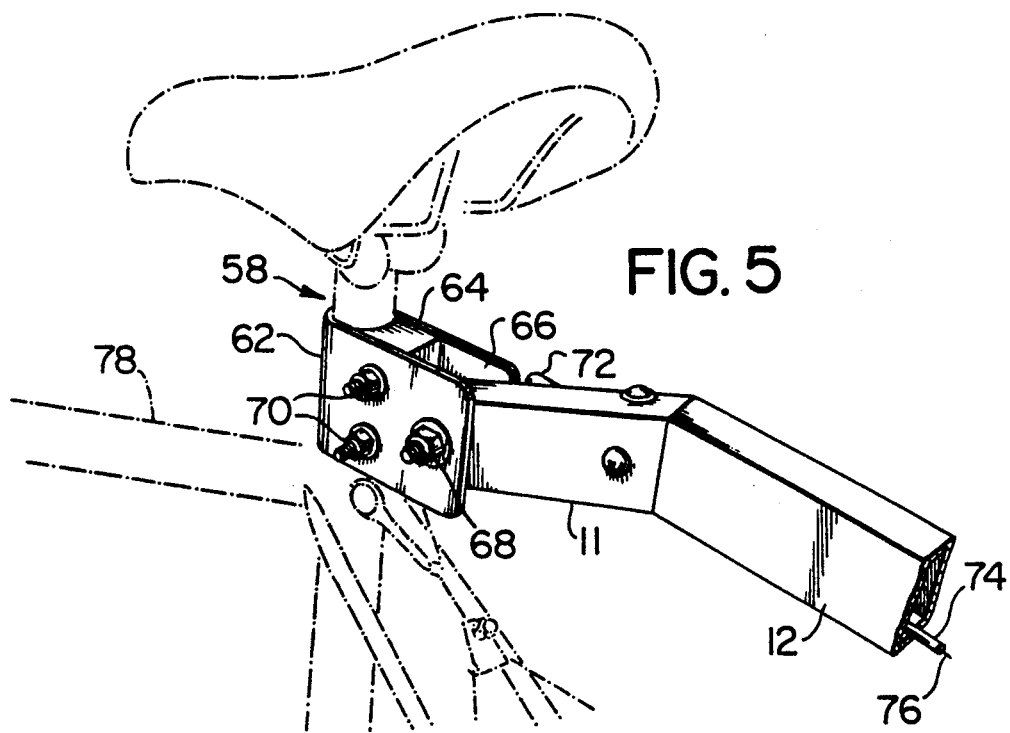
FIG. 5 is a pictorial view of a trailer hitch taken from a point above and slightly behind the bicycle.
Figure 6:
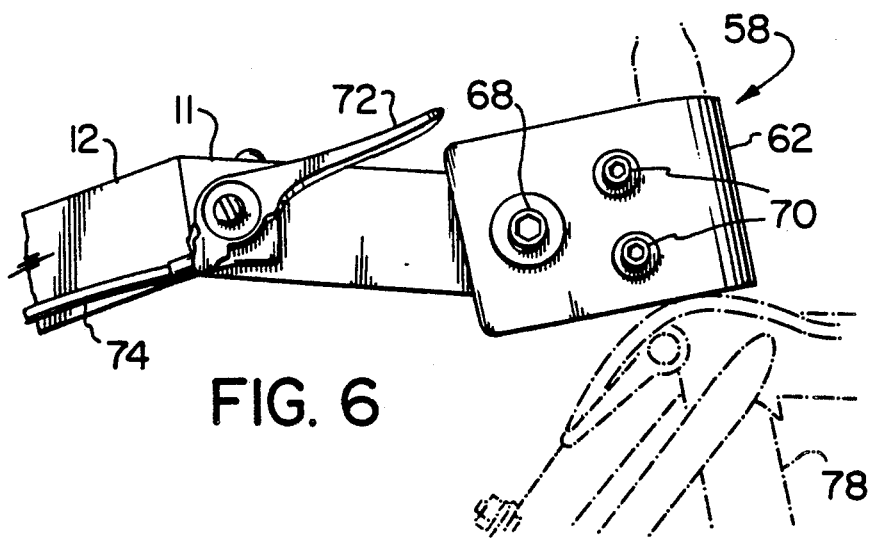
FIG. 6 is a side elevational view of the hitch of FIG. 5.
Figure 7:
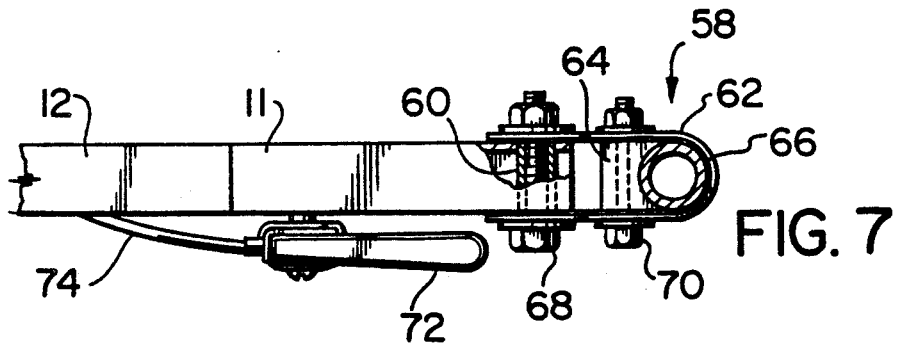
FIG. 7 is a top view of the hitch of FIG. 5.

One form of hitch is shown in FIGS. 5 to 7. The segment 11 has a hole coincident through each side wall located generally away from the end of the member in order to provide adequate strength. A sleeve 60 has a diameter slightly less than the holes in the segment 11 and has an overall width marginally greater than the segment width. In operation the segment will rotate slightly about the axis of the sleeve which remains stationary. The "U" shaped hitch plate 62 is lined with a thin anti-friction shield 66. The shield 66 provides a dual purpose by ensuring a low coefficient of friction between the moving surfaces as well as avoiding damage due to metal contact. The design of the shield allows one continuous sheet to ensure adequate motion for the two degrees of freedom that the hitch allows. The shield material could be a dense polyethylene sheet and it is understood that many materials would be apparent to those skilled in the art. The sleeve 60 is located firmly within the "U" shaped hitch plate 62 with axial loading on the sleeve provided by a main hitch bolt 68. The clearance between the segment 11 and the "U" shaped hitch plate is critical as it determines the free movement and as mentioned earlier it is set by the width of the sleeve 60. A seat post hitch retainer 64 mates to the rear of the seat post of the bicycle 78 and has a profile which closely follows the seat post cross-sectional curvature. This retainer is held in place within the "U" shaped hitch plate by two bolts 70. The "U" shaped hitch plate inner radius and the retainer profile together form a basically circular arrangement of a diameter slightly greater than the seat post outside diameter in order to allow a rotation about the seat post axis.

The invention allows a junior cyclist to participate in the propulsion of the vehicle and provides an excellent solution to the problem of taking children on bicycles in a safe manner. Children by nature enjoy a participatory role rather than a passive role in any activity.

Tests have shown that the child is able to propel himself, the trailer, the principal rider and the bicycle (albeit at a slow speed) without any power input done by the principal rider once the bicycle and trailer are in motion. With both riders pedalling the child may contribute to the net propulsive force and partially offset the additional load to the principal rider. The propulsive force provided by the child is done at will and is not the main means of motion of the joined assembly of bicycle and trailer.

A freewheel on the rear trailer wheel allows the child the option of pedalling or coasting while on the trailer. In this invention, multiple gearing improves the use of the child's propulsive force and can be adjusted by the principal rider to allow for differences in terrain.

The slope of the frame allows the child to be located at a low center of gravity which improves dynamic stability. Another advantage offered by the invention over many known child carrier seats is the low seat to ground plane distance which allows the child to mount or dismount the trailer without assistance.

Clearance is provided between the frame and the rear wheel of the bicycle. This is necessary as road surfaces will cause articulation of the trailer.

The child pedals the crank which drives the rear wheel through the standard bicycle chain. Changes in the driving gear of the child trailer are accomplished by a conventional rear derailleur which moves the trailer chain to a selection of cogs on the freewheel. Control of the child's gear is done by the bicycle rider who manipulates the shift lever near the hitch assembly. The freewheel on the conventional rear bicycle wheel allows the child to coast without pedaling and simply be towed.

The hitch which is fitted to the seat post of the bicycle allows the trailer to track smoothly behind the bicycle. The hitch provides unrestricted motion in the horizontal plane and vertical plane. In a turn initiated by the bicycle rider the hitch will rotate about the bicycle seat post and return to its initial position upon completion of the turn. Any uneven terrain which may cause the trailer to articulate in a vertical plane about the main hitch bolt axis will not impart a bending moment to the bicycle. An advantage of the hitch configuration is that one main hitch bolt is removed to detach the trailer from the bicycle thus providing ease of removal for stowage or transport. The weight load of the child and trailer is shared between the driving bicycle seat post tube and the rear wheel of the trailer with the greater load on the latter. The hitch also resists the torsion offered by the child rider about the frame axis.

The hitch does not interfere with the enjoyment of the bicycle and could remain in place on the bicycle seat post.

The above mentioned embodiment of the invention is intended to be merely exemplary, and numerous variations and modifications of it will be readily apparent to those skilled in the art without departing from the spirit and scope of the invention. All such variations and modifications are intended to be included within the scope of the invention, as defined in the appended claims.

The embodiments of the invention in which an exclusive property or privilege is claimed are defined as follows:

1. A trailer for attachment to a bicycle having a frame, a seat for supporting a rider and a seat post coupling that seat to the frame, comprising:
   (a) an elongated support member having a first and an other end;
   (b) detachable attachment means for pivotally attaching the first end of the support member to a portion of the bicycle so that the support member extends rearwardly in a downwardly inclined fashion;
   (c) driving means attached to the support member intermediate the first and other end;
   (d) a driveable ground engaging wheel rotatably mounted to the other end; and
   (e) seat means attached to the support member for supporting a rider.

2. A trailer according to claim 1 wherein the driveable ground engaging wheel is geared.

3. A trailer according to claim 1 or 2 wherein the driving means includes:
   (a) a crank assembly; and
   (b) a chain for coupling the crank assembly with the driveable ground engaging wheel.

4. A trailer according to claim 3 further comprising:
   (a) a bottom bracket support for coupling the driving means to the support member;
   (b) handlebar means to provide support for a rider;
   (c) a handlebar retaining block for securing the handlebar means to the support member.

5. A trailer according to claim 1 wherein the seat means comprises:
   (a) a seat for supporting the rider; and
   (b) a seat post coupling the seat to the support member.

6. A trailer as defined in claim 5, wherein the detachable attachment means is a hitch, the hitch being releasably securable to the bicycle seat post so as to permit pivotable movement of the support member about a longitudinal axis of the bicycle seat post, and permitting pivotable movement of the support member in a plane defined by the driveable ground engaging wheel.

7. A trailer as defined in claim 5, wherein the detachable attachment is a restraining means for restraining the trailer from tipping laterally when attached to the driving bicycle.

8. A trailer according to claim 7 wherein the restraining means is included in the detachable attachment means.

9. A trailer according to claim 6 wherein the pivotable movement of the support member and the hitch means is performed by a single pivotal retainer.

10. A trailer according to claims 5 or 9 wherein the ground engaging wheel gearing is variable.

11. A trailer for attachment to a bicycle having a frame, a seat for supporting a rider and a seat post coupling that seat to the frame, comprising:
    (a) an elongated support member having a first and an other end;
    (b) hitch means for detachable attachment to the bicycle, the hitch means being releasably securable to the bicycle seat post so as to permit pivotal movement of the support member about a longitudinal axis of the seat post, and permitting pivotable movement of the support member in a plane defined by a driveable ground engaging wheel when attached to the bicycle;
    (c) driving means attached to the support member intermediate the first and an other end, the driving means including a crank assembly;
    (d) the driveable ground engaging wheel being geared and rotatably mounted to the other end;
    (e) seat means attached to the support member for supporting the rider;
    (f) a chain for coupling the crank assembly with the geared driveable ground engaging wheel;
    (g) a bottom bracket support for coupling the driving means to the support member;
    (h) handlebar means to provide support for a rider;
    (i) a handlebar retaining block for securing the handlebar means to the support member;
    (j) restraining means included in the hitch means;
    (k) pivotable movement of the support member and the hitch means performed by a single pivotal retainer; and
    (l) the ground engaging wheel provided with multigeared operation including a derailleur, cabling and shift lever.

12. A trailer according to claim 4 wherein means secure the handle bar means to the support member for longitudinal adjustable positioning on the support member.

13. A trailer according to claim 11 wherein means secure the handle bar means to the support member for longitudinal adjustable positioning on the support member.

14. A trailer according to claim 6 wherein the hitch comprises a "U"-shaped plate within which is secured a retainer means to receive the bicycle seat post so as to permit pivotal movement of the hitch about the longitudinal axis of the bicycle seat post, the "U"-shaped plate also to receive between the arms of the "U" said first end of the support member so as to permit relative pivotal movement of the support member with respect to the hitch in the plane defined by the driveable ground engaging wheel.

* * * * *